United States Patent [19]

Klingel

[11] Patent Number: 4,719,691
[45] Date of Patent: Jan. 19, 1988

[54] TOOL CHANGE MECHANISM FOR PUNCH PRESSES AND THE LIKE

[75] Inventor: Hans Klingel, Moglingen, Fed. Rep. of Germany

[73] Assignee: Trumpf GmbH & Co., Fed. Rep. of Germany

[21] Appl. No.: 793,563

[22] Filed: Oct. 31, 1985

[30] Foreign Application Priority Data

Mar. 11, 1984 [DE] Fed. Rep. of Germany ....... 3440224

[51] Int. Cl.⁴ .......................................... B23Q 3/155
[52] U.S. Cl. ....................................... 29/568; 72/446; 83/563
[58] Field of Search ............... 29/568, 264, 26 R; 72/446, 462, 470, 447, 448; 83/563; 211/1.5

[56] References Cited

U.S. PATENT DOCUMENTS

| | | | |
|---|---|---|---|
| 3,745,646 | 7/1973 | Kristiansson | 72/446 |
| 3,816,904 | 6/1974 | Herb | 29/568 |
| 4,103,414 | 8/1978 | Herb et al. | 29/568 |
| 4,196,501 | 4/1980 | Shimajiri et al. | 29/568 |
| 4,274,801 | 6/1981 | Herb et al. | 269/73 |
| 4,486,941 | 12/1984 | Scott et al. | 29/568 |

FOREIGN PATENT DOCUMENTS

2224202 11/1973 Fed. Rep. of Germany ........ 29/568

Primary Examiner—Z. R. Bilinsky

[57] ABSTRACT

A tool storage and transfer mechanism for a tool changer punch press includes a magazine with at least two tool carrying elements located in spaced positions about its periphery adapted to releasably seat punch tooling. The magazine is mounted for rotation about a horizontal axis which is spaced below the plane of the work support surface of the punch press with the distance being dimensioned to locate the tool carrying elements in horizontal alignment with the tool mounting receptacles of the punch press when the magazine is rotated to locate them in the uppermost position. A peripheral portion of the magazine is of reduced radial dimension so that it will not extend above the plane of the workpiece support surface of the press when rotated into the uppermost position. A transfer mechanism effects the transfer of tooling between the uppermost tool carrying element of the magazine and the tool mounting receptacle of the punch press. In the preferred embodiment, the transfer mechanism effect horizontal motion of at least a portion of the magazine relative to the frame to move the tooling to and from the tool mounting receptacles.

28 Claims, 5 Drawing Figures

TOOL CHANGE MECHANISM FOR PUNCH PRESSES AND THE LIKE

BACKGROUND OF THE INVENTION

The present invention relates to punching and nibbling machines and more specifically to tool changer type machines having tool magazines and transfer mechanisms.

Punch presses are widely employed for producing cutouts of various shapes in workpieces. In a nibbling machine, the punch tooling is operated repetitively as the workpiece is being moved through the work station to produce a large cutout of a desired contour.

Although there are manually operated punch presses wherein the aperature moves the workpiece on the support table relative to the work station, most modern or high volume punch presses include an X-Y coordinate guide system and numeric control system to clamp and move the workpiece automatically in accordance with a predetermined program. Moreover, since many machines are intended to produce cutouts of various sizes and configurations, magazines of various types have been provided to carry a multiplicity of sets of punch and die tooling for use at the work station.

In some punch presses and nibbling machines, the cooperating punch and die tooling is respectively carried in upper and lower turrets which rotate the tooling into the operative work station position. One of the turrets is located below the support plane of the workpiece and the other is located thereabove; and the ram strikes the punch to drive it downwardly within the upper turret against the workpiece and into the die which is supported in the lower turret. As will be appreciated, such turret-type magazines occupy a substantial amount of space and impede access of the operator to portions of the press.

In tool changer punch presses, the tooling is stored in a tool storage portion, and a transfer mechanism is provided to move the desired tooling therefrom into the operating positions. Such tool changer type presses have the advantage of effecting firm coupling of the punch to the ram, and positive support for the die below the workpiece. However, such automatic tool changers also occupy a substantial amount of space and impede operator access to portions of the punch press.

Depending upon the mode of support for the turrets in a turret-type punch press and the method for effecting rotation thereof, and depending upon the mode of support for the tool changer magazine and transfer mechanism, the amount and direction of movement of the workpiece on the support table may be limited thereby.

It is an object of the present invention to provide a novel and compact magazine and tool transfer mechanism for tool changer punch presses and the like.

It is also an object to provide such a mechanism so that the workpiece may move freely thereover, and which enables the operator to have ready access to the entire periphery of the press about the work station.

Another object is to provide a punch press and nibbling machine in which such a magazine and transfer mechanism is ruggedly constructed for long lived operation.

SUMMARY OF THE INVENTION

It has now been found that the foregoing and related objects and advantages may be readily attained by a tool storage and transfer mechanism in combination with a punch press or like apparatus having a frame providing a horizontal support surface for an associated workpiece, and a reciprocable ram assembly with a tool mounting receptacle spaced above the support surface. The mechanism includes a magazine with at least two tool carrying elements at spaced points about its periphery, each of which is adapted to seat releasably a tool adapted to seat in the tool mounting receptacle of the ram assembly. Suitable means mounts the magazine for rotation about a horizontal axis spaced a distance below the plane of the support surface. This distance is of a dimension to locate the tool carrying elements in horizontal alignment with the tool mounting receptacle when the magazine is rotated to locate them in uppermost position. The magazine also has a peripheral portion of reduced radial distance so as not to extend above the plane of the horizontal support surface when rotated into the uppermost position. There is also included means for transferring tooling between the uppermost tool carrying element of the magazine and the tool mounting receptacle of the punch press.

In the preferred assembly, the punch press has a die receptacle vertically aligned below the tool mounting receptacle, and the tool carrying elements of the magazine each have a pair of radially spaced tool carrying seats for a cooperating punch and die set, with these tool carrying seats being horizontally aligned with the tool mounting and die receptacles when rotated into the uppermost position. The means for transferring tooling effects horizontal motion of the magazine relative to the frame of the punch press to move the tooling supported therein into the tool mounting receptacles. Preferably, the mounting means comprises a shaft extending horizontally from the frame, and the transfer mechanism effects horizontal movement of the magazine along the shaft in a reciprocal direction.

Most desirably, the magazine is of generally circular peripheral configuration with a portion of its periphery removed to provide a chordal surface at a radial distance not greater than the radial spacing to the plane of the work support table. The tool carrying elements are equiangularly spaced about the the inner face of the magazine and adjacent its periphery.

In one embodiment, the magazine, mounting means and transfer means are disposed upon a common base which is removably engageable with the punch press frame.

In another embodiment, the magazine is comprised of a pair of concentric magazine elements supported on the mounting means for concurrent rotation, the outer of which provides the tool carrying seat for the punch tooling and the inner of which provides the tool carrying seat for the die.

In accordance with preferred operation, there is included a computer control mechansim for automatically effecting rotation of the magazine and operation of the transfer means.

DETAILED DESCRIPTION OF THE ILLUSTRATED EMBODIMENTS

Figure 1:
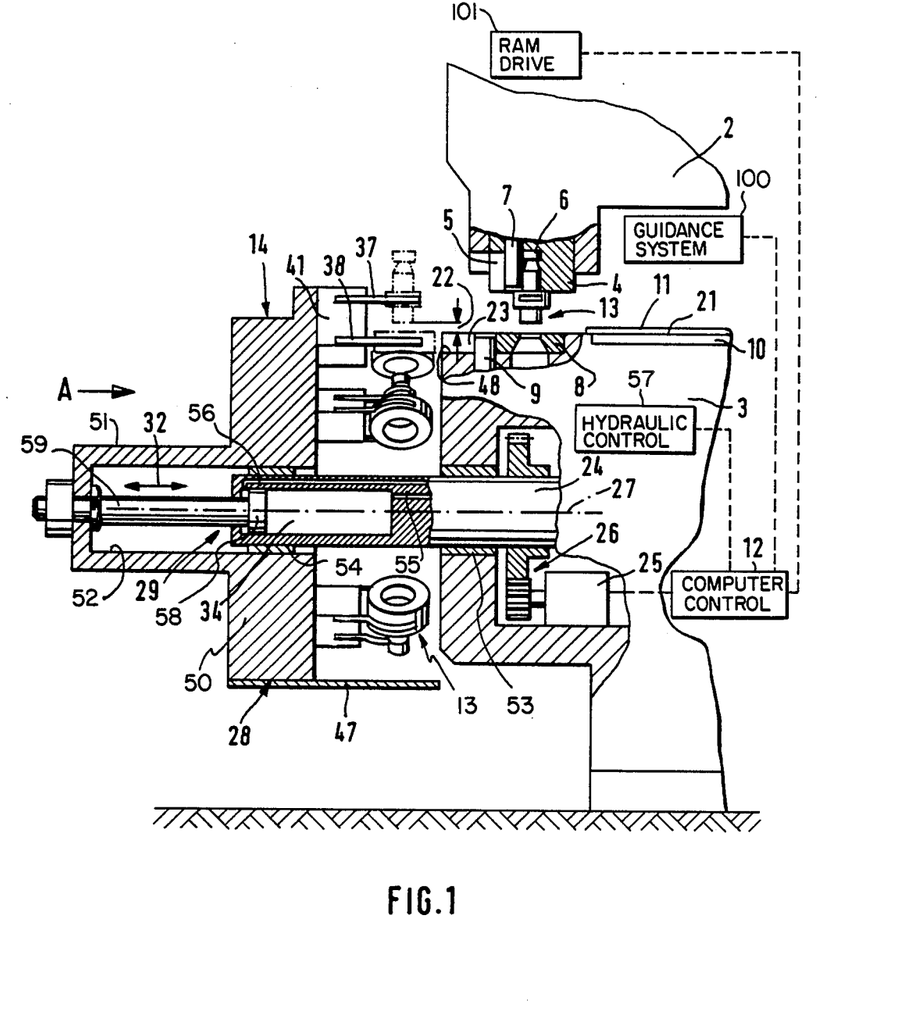
FIG. 1 is a fragmentary side elevational view in partial section of a punch press or nibbling machine embodying the tool magazine and changer mechanism of the present invention.
Figure 2:
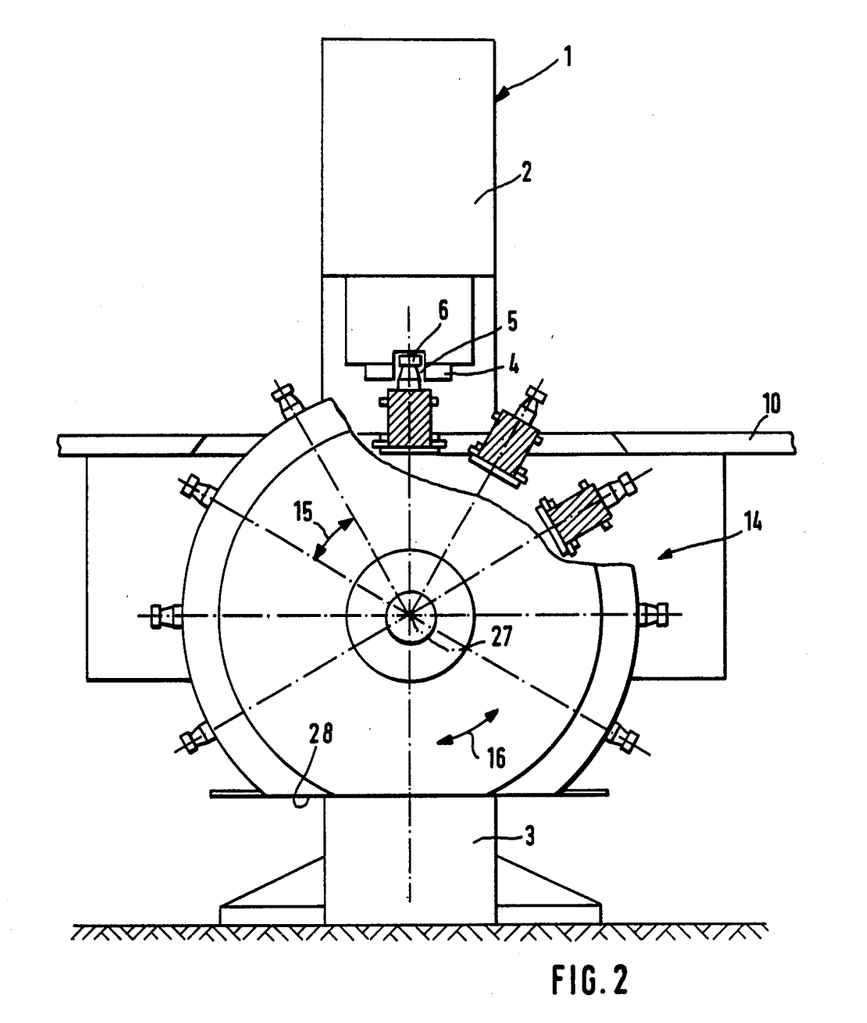
FIG. 2 is a front elevational view thereof.

Turning first to FIGS. 1 and 2 of the attached drawings, therein illustrated is a punch press or nibbling press of the tool changer type generally designated by the numeral 1 and having a base 3 and a cantilever arm 2 extending thereover. In the arm 2, there is mounted for reciprocation the ram assembly 4 which is reciprocable by the drive mechanism 100 within the cantilever arm 2 in a conventional fashion. At its lower end, the ram assembly 4 has a tool receiving receptacle 5 which seats a punch 6 which is releasably locked in place by a latching device 7.

The machine base 3 includes a support table 10 upon which is disposed the workpiece 11, and the workpiece 11 is movable thereon in the work support plane 21 by X-Y guidance system 101. In the forward portion of the base 3 is a die receptacle 23 in which is disposed the die 8 in alignment with the punch 6, and the die 8 is releasably latched in position by the latching device 9.

In operation of the press, the workpiece 11 is moved on the table 10 by a suitable X-Y guidance system 101 between the punch 6 and die 8 as the punch 6 is reciprocated by the ram assembly 4 relative thereto to produce the desired cutouts therein. A suitable X-Y guidance system is described in Herb et al U.S. Pat. No. 4,274,801 granted on June 23, 1981.

Supported on the front face of the punch press 1 is a tool magazine and changer mechanism generally designated by the numeral 14 and embodying the present invention. The magazine 14 includes a generally circular element 50 which has, at one point about its periphery, a portion thereof removed as indicated by the numeral 28, and a cover plate 47 is secured to the chordal surface provided thereby. Extending outwardly from the center of the circular component 50 is a hub portion 51, and a bore 52 extends through the circular component 50 and hub 51.

The magazine 14 is rotatably mounted upon the frame 3 by a shaft 24 which seats in bearings 53 and 54 disposed in the frame 3 and in the bore 52. Rotation of the shaft 24 about its axis of rotation 27 will thus effect rotation of the magazine 14 about this axis. This rotation is effected by the motor 25 which has its output shaft transmitting the rotational motion to the shaft 24 through the gear drive generally designated by the numeral 26.

At equiangularly spaced points (represented by the arrow 15) about the inner surface of the arcuate portion of the generally circular member 50 are a series of tool retainer assemblies 41 including the vertically spaced tool retainer elements 37, 38. Tool sets generally designated by the numeral 13 comprising a cooperating punch and die are releasably seated in the elements 37 and 38. Rotation of the magazine 14 about the axis 27 will locate the retainer elements 37 and 38 in horizontal alignment with the tool receptacles 5 and 23 for the punch 6 and die 8.

To effect transfer of the tooling 13 between the receptacles 5 and 23 and the tool retainer assembly 41 of the magazine 14, there is incorporated a transfer mechanism geneally designated by the numeral 29 to effect reciprocation of the magazine 14 in a horizontal direction as indicated by the double-headed arrow 32. In this embodiment, the shaft 24 has a cylinder 34 formed adjacent its outer end, and a pair of flow passages 55, 56 communicating therewith from a source of hydraulic fluid 57 which is only diagrammatically illustrated. Seated within the cylinder 34 is a piston 58 which is integral with the rod 59 bolted at its outer end to the hub 51.

Upon introduction of hydraulic fluid under pressure from the source 57 through the passages 55, 56 to the cylinder 34 on opposite faces of the piston 58, relative motion of the piston 58 within the chamber 34 inwardly and outwardly will occur in the direction of the double-headed arrow 32, thus effecting the reciprocal motion of the entire magazine 14 relative to the base 3.

The tool retainers 37, 38, if empty, will be moved inwardly and grip a punch 6 and die 8 to effect their removal from the receptacles 5, 23. Actuation of the piston 58 is then effected to move the entire magazine 14 back to the position shown in FIG. 1, at which time the motor 25 is actuated to rotate the magazine 14 to locate the desired tooling 13 in the uppermost position for insertion into the tool receptacles 5, 23.

The transfer of mechanism 29 is again actuated to move the tool magazine 14 inwardly, and the tooling 13 in the retainer elements 37, 38 is thus transferred into the tool receptacles 5 and 23. The transfer mechanism 29 is again actuated to move the magazine 14 into the position seen in FIG. 1, thus enabling the operation of the punch press with a new set of tooling.

Figure 3:
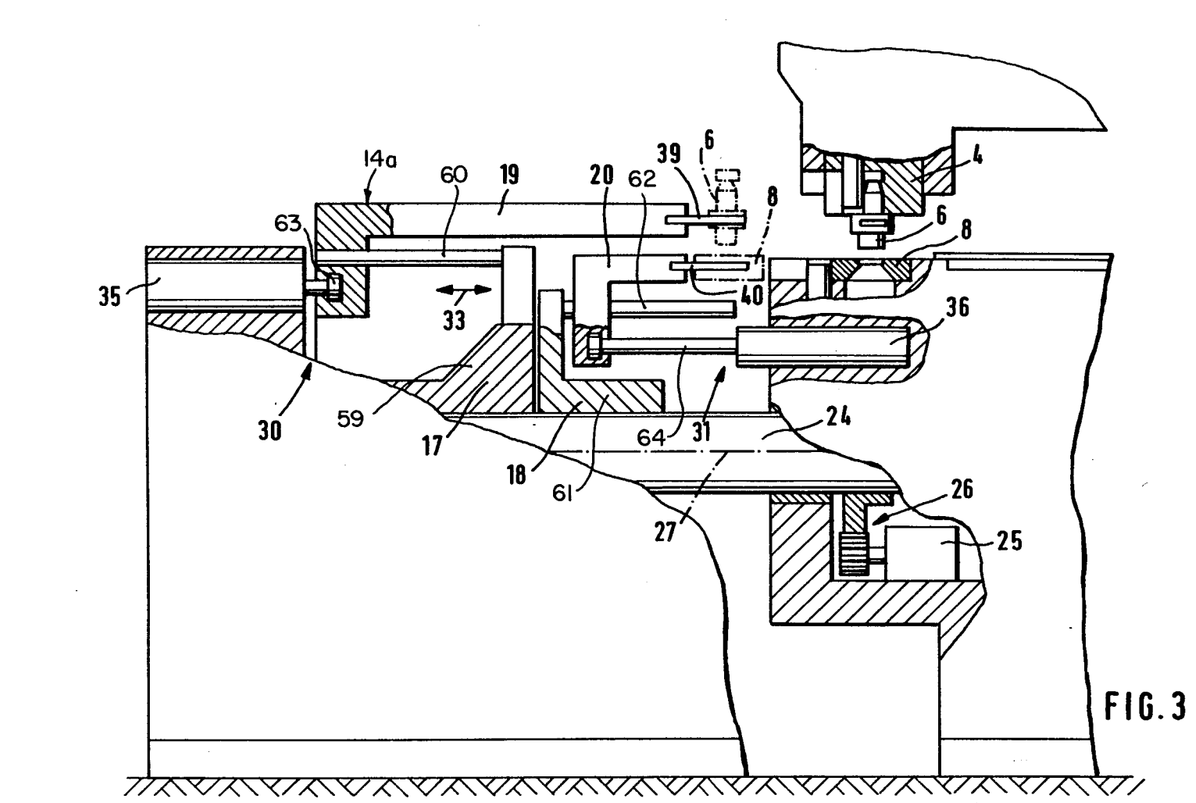
FIG. 3 is a fragmentary side elevational view in partial section of a punch press employing an alternate tool magazine changer mechanism embodying the present invention.

Turning now to FIG. 3 of the attached drawings, there is illustrated an alternate embodiment of a tool magazine and transfer system of the present invention. In this embodiment, the magazine generally designated by the numeral 14a is comprised of an outer magazine member 19 and an inner magazine member 18 which are mounted concentrically for rotation upon the shaft 27. The outer magazine member 17 has a generally cylindrical tool carrying portion 19 which is separate from the inner base portion 59 upon which is supported by the slide bars 60 for movement horizontally with respect thereto as indicated by the arrow 33. At the inner end of the tool carrying portion 19 at equiangularly spaced points thereabout are tool retainers 39 which seat punch tooling 6.

The inner magazine 18 also includes an inner core member 61 and a generally cylindrical tool carrying portion 20 which is movably supported thereon by the slide bars 62. The tool carrying portion 20 fits within the tool carrying portion of the outer magazine member 17 and is movable relative thereto in the direction of the double-headed arrow 33. On the inner face of the tool carrying portion 20 are retainers 40 which seat the die tooling 8.

As in the embodiment of FIGS. 1 and 2, when rotated to the uppermost position, the retainers 39 and 40 are horizontally aligned with the tool receptacles 5 and 23 so as to enable interchange of the tooling 6 and 8 therein. Rotation of the shaft 24 will effect concurrent rotation of the inner and outer magazines 17 and 18; as a result, the matched or cooperating tooling 6 and 8 is concurrently moved into alignment with the tool receptacles 5, 23.

The tool transfer mechanism 30 effects the movement of the outer magazine 17 and is comprised of the cylinder 35 which acts upon a piston rod 63 seated in the flange of the outer tool carrying portion 19. This causes the outer tool carrying portion 19 to move inwardly and outwardly relative to its core portion 59 by sliding movement upon the slide bars 60. As the retainer 39 moves relative to the tool receptacle 5, it removes or inserts the punch tooling 6 therein.

The inner magazine is reciprocated by a transfer mechanism generally designated by the numeral 31 and comprised of the cylinder 36 which acts upon the piston rod 64 which is seated in the inner tool carrying portion 20. This effects its reciprocation on the slide bars 62 relative to its core portion 61 and thus effects the transfer of die tooling 8 into and from the receptacle 23.

Figure 4:
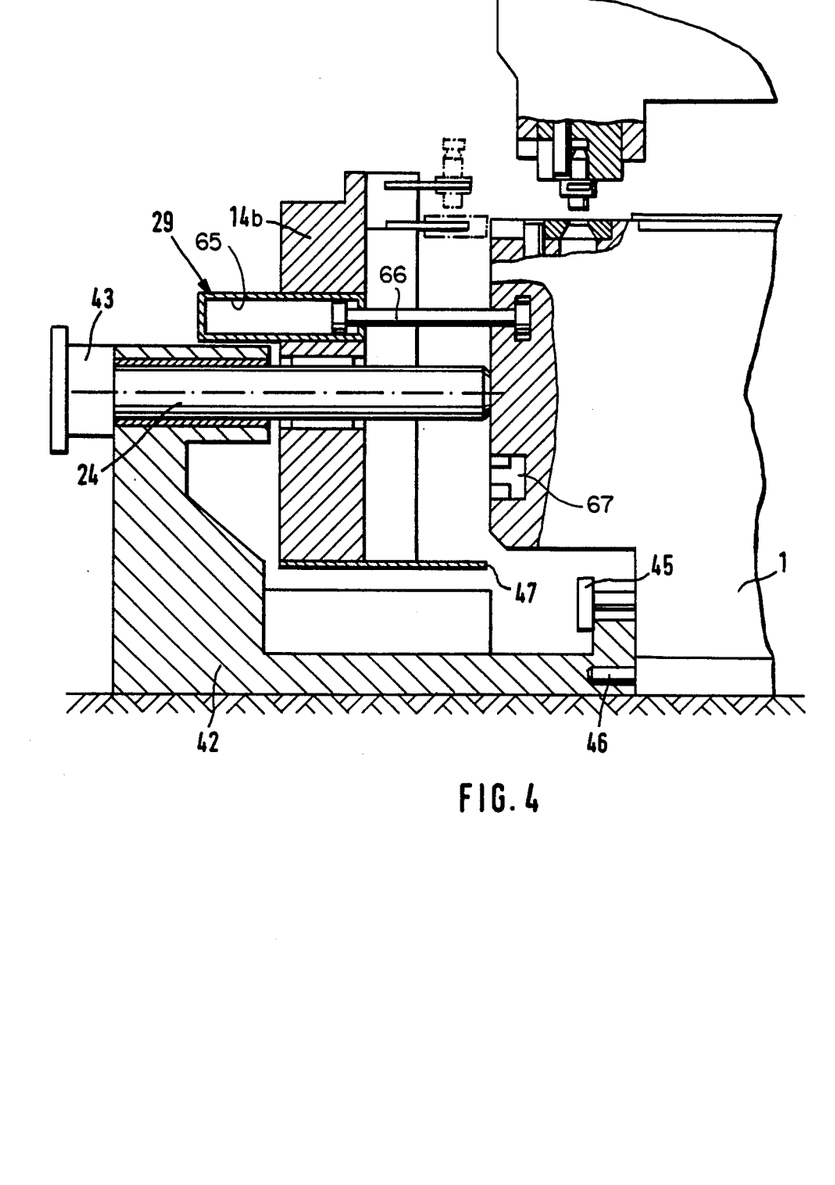
FIG. 4 is a side elevational view in partial section of still another embodiment of punch press utilizing another variant of the tool magazine changer magazine.

Turning now to FIG. 4 of the attached drawings therein illustrated is another embodiment of the present invention which enables the rapid substitution of a complete magazine and transfer assembly into an operative position with respect to the punch press 1. In this embodiment, the magazine 14b is supported for rotation upon the shaft 24 which is journalled in a movable base 42 which can be moved manually or by means of suitable mechanism (not shown) into a position against the frame 3 of the punch press 1. The base 42 is positively located by its alignment with the locating pins 46, and it is locked in place by the clamp 45. In this embodiment, the drive motor 43 for rotating the shaft 24, and thereby the magazine 14b, is mounted upon the movable base 42.

To effect movement of the magazine 14 inwardly and outwardly relative to the tool receptacles 5, 23, the transfer mechanism 29 includes a cylinder 65 and a piston rod 66 which has a head on its outer end slidably seated in a circular keyway 67 in the face of the base 3. Thus, when the magazine 14b is rotated, the piston rod 66 will slide in the keyway 67. At the assembly point for the magazine assembly, the keyway 67 has an entry aperture to permit the insertion of the piston head.

Although the magazine in this embodiment is a single member containing the cooperating punch and die tooling in radially spaced relationship, the same principle can be applied to a pair of concentric magazine elements in the type shown in the embodiment of FIG. 3. Whether of single or double element construction, it will be appreciated that the magazine assembly can be removed from the punch press, and the magazine elements removed therefrom simply and easily by pulling them off the shaft. Thus, different sets of tooling can be provided in such removable magazine assemblies, and the entire assembly interchanged as required with new tooling being loaded in an assembly while it is disassembled from the punch press.

Figure 5:
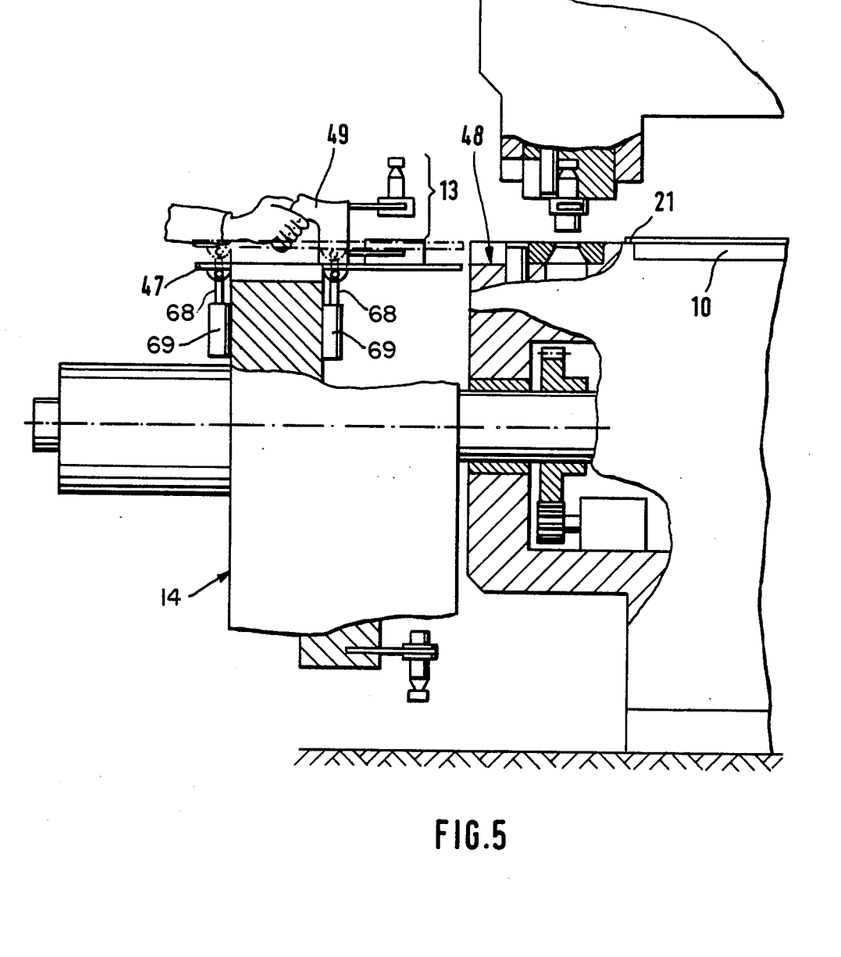
FIG. 5 is a fragmentary side elevational view similar to FIG. 1 with the magazine rotated 180° from the position seen in FIG. 5, and showing a set of tooling being introduced into the operative punch and die positions by means of a manual cartridge mechanism.

Turning now to the embodiment of FIG. 5, the cover plate 47a is supported on two piston rods which are movable by the piston 69 from the full line position to the phantom line position. In the phantom line position, the workpiece 11 can slide thereon since the cover plate 47a lies in the plane of workpiece travel 21 as defined by the upper surface of the support table 10.

When it is desired to insert tooling 13 manually into the tool receptacles 5 and 23, the pneumatic or hydraulic cylinders 69 are actuated to move the cover plate 47a downwardly to the full line position shown in FIG. 5 where its upper surface is aligned with the die support plane 48. In the manner, a manual tool change cartridge 49 can be supported upon the plate 47a and slid onto the die support plane 48 into precise registry with the tool receptacles 5 and 23 to effect manual interchange of the tooling 13. Tooling can be removed from or inserted into the tool receptacles 5, 23, and thus used to reload the several positions about the magazine 14.

In each of the several illustrated embodiments, the adjacent face of the base 3 of the punch press 1 is cooperatively dimensioned and configured with respect to the tool carrying portions of the magazine so that the tool carrying portions may move freely thereabout when the transfer mechanism effects the horizontal motion of the magazine 14.

To effect rotation from the inoperative position wherein the plate 47 is disposed upwardly so as to permit unimpaired motion of the workpiece 11 and support thereof, the electric motor used to effect rotation of the shaft 24 supporting the magazine 14 should be bidirectional to minimize the time required for rotation to locate the tooling 13 in the uppermost or operative position for tool exchange. This bidirectional motion is indicated by the arrow 16 in FIG. 2. As soon as the tooling has been moved into the tool receptacles 5, 23, the magazine 14 is again moved outwardly and rotated rapidly to orient the cover plate 47 in the uppermost position and provide an extension of the support plane 21 of the support table 10.

As is customary in computer numerically controlled apparatus, the computer control 12 is programmed to effect many of the motions automatically and in timed relation. It will effect control of the guidance system 100 to move the workpiece 11 and effect operation of the ram drive 101 to punch the workpiece 11 as it is being moved thereby. When it is desired to change the tooling, the computer control 12 will actuate the motor 25 to rotate an empty retainer 41 to the uppermost position, then actuate the hydraulic fluid source 57 to move the magazine 14 inwardly until the punch 6 and die 8 are received within the tool retainers 37 and 38, the latching mechanisms 7 and 9 having been disengaged to permit the withdrawal of the punch 6 and die 8 therefrom. The computer control 12 will then effect rotation of the magazine 14 to locate the desired tooling in the uppermost position, and will actuate the hydraulic fluid source 57 to move the magazine inwardly and thereby move the new tooling 13 into the receptacles 5 and 23. The direction of hydraulic fluid flow is reversed to move the magazine 14 outwardly and the motor 25 is actuated to rotate the magazine 14 to bring the cover plate 47 into the uppermost position for a continuation of the punching operation.

Obviously, this rotation cannot be effected if the workpiece 11 extends beyond the surface of the table 10 and into the plane of rotation of the magazine 14. Under such circumstances, the control 12 would first effect movement of the workpiece 11 into a remote position to permit the necessary rotation and tool exchange.

Although hydraulic mechanisms have been shown to effect movement of the transfer mechanism, it will be appreciated that pneumatic devices may be employed as can be gear-type devices to effect the desired linear motion. Moreover, in the instance of the double magazine element construction, the concentric elements may be driven separately by separate motor drives, although such a construction involves unnecessary complexity.

The number of tool retainers spaced about the magazine may vary substantially. It is necessary, however, that there be adequate spacing between them to ensure that interference will not occur with largely sized tooling seated therein. The amount of the circumference of the magazine which can be utilized for such tooling will depend upon the relative dimensioning of the projecting portion of the base 3 of the punch press and the effective diameter of the magazine 14.

It will be readily appreciated from the foregoing detailed description and the attached drawings that the tool magazine and transfer device of the present invention materially reduces the space requirments for effecting automatic tool change and leaves the space above the workpiece plane free during operation of the machine. By utilizing the magazine itself as the means for effecting the lateral motion for tool transfer, a relatively simple and compact assembly may be provided.

Although it has not been illustrated, punch tooling will generally include a stripper as well as a punch and die. It will be appreciated that the retainer elements illustrated can be modified to support stripper tooling for movement into and outwardly of the mounting position in the punch press 1.

Although the actual peripheral configuration of the magazine can vary, it is essential that the magazine configuration provide a circumferential portion which will not extend above the work support plane when it is rotated into the uppermost position. Moreover, the peripheral portion in which the tooling is carried must extend above the work support plane when roboted to the uppermost position in order to be horizontally aligned with the receptacle for the punch tool and that for the stripper tooling when employed.

Thus, the present invention provides a relatively simple, durable and compact automatic tool change mechanism enabling free access to the front of the press and free movement of the workpiece thereover. The tooling can be changed simply and conveniently by inserting and removing tooling from the operative positions in the punch press. It is also possible to utilize removable magazines. The economy and effiency provided by this magazine and transfer mechanism in smaller punch presses are most substantial.

Having thus described the invention, I claim:

1. In combination with a punch press or like apparatus having a frame providing a horizontal support surface for an associated workpiece, and a reciprocable ram assembly with a tool mounting receptacle spaced above said support surace, a tool storage and transfer mechanism comprising:
   a. A magazine having its principal dimensions extending in a vertical plane parallel to the axis of reciprocation of said ram assembly and rotatable about a horizontal axis perependicular thereto, said magazine having a major portion with a periphery circumscribing an arc of a first radial distance from said horizontal axis and a minor portion having a periphery of a second radial distance from said horizontal axis reduced from that of said first radial distance, the peripheries of said major and minor portions being generally continuous and defining a closed geometric figure, said magazine having at least five tool carrying elements at spaced points about said periphery of said major portion and each adapted to seat releasably a tool adapted to seat in the tool mounting receptacle, and tools seated in substantially all of said tool carrying elements, said magazine comprising the sole component of said punch press for storing tooling for movement into said tool mounting receptacle;
   b. means mounting said magazine for rotation about said horizontal axis which is spaced a distance below the plane of said support surface, said distance being of a dimension to locate said tool carrying elements in horizontal alignment with said tool mounting receptacle when said magazine is rotated to locate them in uppermost position, said magazine minor portion reduced radial distance being of a dimension relative to said horizontal axis so that its periphery does not extend above the plane of said horizontal support surface when rotated into the uppermost position;
   c. means for transferring tooling between the uppermost tool carrying element of said magazine and the tool mounting receptacle of said punch press; and
   d. means for rotating said magazine to orient a selected tool mounting receptacle in said uppermost position for tooling transfer by said transferring means and for thereafter rotating said magazine to orient said reduced peripheral portion in said uppermost position so that said plane of said work support surface is spaced above said magazine to permit free motion of a workpiece thereover.

2. The combination in accordance with claim 1 wherein said punch press has a die receptacle vertically aligned below said tool mounting receptacle, and wherein said tool carrying elements of said magazine each have a pair of radially spaced tool carrying seats for a cooperating punch and die set, said tool carrying seats being horizontally aligned with said tool mounting and die receptacles when rotated into the uppermost position.

3. The combination in accordance with claim 1 wherein said magazine, mounting means and transfer means are disposed upon a common base which is removably engageable with said punch press frame.

4. The combination in accordance with claim 1 in which said means for transferring tooling effects horizontal motion of said magazine relative to said frame of said punch press to move the tooling supported therein into the tool mounting receptacle of the ram assembly.

5. The combination in accordance with claim 4 wherein said mounting means comprises a shaft extending horizontally from said frame, and wherein said transfer mechanism effects horizontal movement of said magazine about said shaft in a reciprocal direction.

6. The combination in accordance with claim 1 wherein said magazine is of truncated generally circular peripheral configuration with a portion of its periphery removed to provide a chordal surface at a radial distance not greater than the radial spacing to the plane of the work support table.

7. The combination in accordance with claim 6 wherein said tool carrying elements are equiangularly spaced about the inner face of said remainder of said periphery of said magazine and adjacent its periphery.

8. The combination in accordance with claim 2 wherein said magazine is comprised of a pair of concentric magazine elements supported on said mounting means for concurrent rotation, the outer of which provides the tool carrying seat for the punch tooling and the inner of which provides the tool carrying seat for the die.

9. The combination in accordance with claim 8 wherein said mounting means comprises a shaft, wherein both of said magazine elements are supported on said shaft, and wherein said transfer mechanism effects horizontal movement of said magazine elements carrying said seats.

10. The combination in accordance with claim 1 wherein there is included a computer control mechanism for automatically effecting rotation of said magazine and operation of said transfer means.

11. In combination with a punch press or like apparatus having a frame providing a horizontal support surface for an associated workpiece, and a reciprocable ram assembly with a tool mounting receptacle spaced above said support surface, a tool storage and transfer mechanism comprising:
   a. a magazine having its principal dimensions extending in a vertical plane parallel to the axis of reciprocation of said ram assembly and rotatable about a horizontal axis perpendicular thereto, said magazine having a major portion with a periphery circumscribing an arc of a first radial distance from said horizontal axis and a minor portion having a periphery of a second radial distance from said horizontal axis reduced from that of said first radial distance, the peripheries of said major and minor portions being generally continuous and defining a closed geometric figure of truncated, generally circular configuration with a truncated peripheral portion extending chordally thereof providing said minor portion, at least five tool carrying elements at spaced points about the periphery of said major portion and each adapted to seat releasably a tool adapted to seat in the tool mounting receptacle, and tools seated in substantially all of said tool carrying elements, said magazine comprising the sole component of said punch press for storing tooling for movement into said mounting receptacle;
   b. means mounting said magazine for rotation about said horizontal axis which is spaced a distance below the plane of said support surface, said distance being of a dimension to locate said tool carrying elements in horizontal alignment with said tool mounting receptacle when said magazine is rotated to locate them in uppermost position, said magazine reduced radial distance being of a dimension relative to said horizontal axis so that its truncated chordal surface does not extend above the plane of the work support table when rotated into the uppermost position;
   c. means for transferring tooling between the uppermost tool carrying element of said magazine and the tool mounting receptacle of said punch press, said means for transferring tooling effects horizontal motion of said magazine relative to said frame of said punch press to move the tooling supported therein into the tool mounting receptacle of the ram assembly; and
   d. means for rotating said magazine to orient a selected tool mounting receptacle in said uppermost position for tooling transfer by said transferring means and for thereafter rotating said magazine to orient said truncated peripheral portion in said uppermost position so that said plan of said work support surface is spaced above said magazine to permit free motion of a workpiece thereover.

12. The combination in accordance with claim 11 wherein said punch press has a die receptacle vertically aligned below said tool mounting receptacle, and wherein said tool carrying elements of said magazine each have a pair of radially spaced tool carrying seats for a cooperating punch and die set, said tool carrying seats being horizontally aligned with said tool mounting and die receptacles when rotated into the uppermost position.

13. The combination in accordance with claim 11 wherein said mounting means comprises a shaft extending horizontally from said frame, and wherein said transfer mechanism effects horizontal movement of said magazine along said shaft in a reciprocal direction.

14. The combination in accordance with claim 11 wherein said tool carrying elements are equiangularly spaced about the inner face of said remainder of said periphery of said magazine and adjacent its periphery.

15. The combination in accordance with claim 11 wherein there is included a computer control mechanism for automatically effecting rotation of said magazine and operation of said transfer means.

16. A punch press or like apparatus having:
   a. a frame providing a horizontal support surface for an associated workpiece;
   b. a reciprocable ram assembly with a tool mounting receptacle spaced above said support surface;
   c. a die receptacle in said frame below said ram assembly;
   d. a magazine having its principal dimensions extending in a vertical plane parallel to the axis of reciprocation of said ram assembly and rotatable about a horizontal axis perpendicular thereto, said magazine having a major portion with a periphery circumscribing an arc of a first radial distance from said horizontal axis and a minor portion having a periphery of a second radial distance from said horizontal axis reduced from that of said first radial distance, the peripheries of said major and minor portions being generally continuous and defining a closed geometric figure of truncated, generally circular configuration with a truncated periperal portion extending chordally thereof providing said minor portion, at least five tool carrying elements at spaced points about the periphery of said major portion and each adapted to seat releasably a tool adapted to seat in the tool mounting receptacle, and tools seated in substantially all of said tool carrying elements, said magazine comprising the sole component of said punch press for storing tooling for movement into said tool mounting receptacle;
   e. means mounting said magazine for rotation about said horizontal axis which is spaced a distance below the plane of said support surface, said distance being of a dimension to locate said tool carrying elements in horizontal alignment with said tool mounting receptacle when said magazine is rotated to locate them in uppermost position, said magazine reduced radial distance being of a dimension relative to said horizontal axis so that its truncated chordal surface does not extend above the plane of the work support table when rotated into the uppermost position;
   f. means for transferring tooling between the uppermost tool carrying element of said magazine and the tool mounting receptacle of said punch press, said means for transferring tooling effects horizontal motion of said magazine relative to said frame of said punch press to move the tooling supported therein into the tool mounting receptacle of the ram assembly;
   g. drive means for reciprocating said ram assembly;

h. drive means for effecting rotation of said mounting means to orient a selected tool mounting receptacle in said uppermost position for tooling transfer by said transferring means and for thereafter rotating said magazine to orient said reducing peripheral portion in said uppermost position so that said plane of said work support surface is spaced above said magazine to permit free motion of a workpiece thereover;

i. drive means for said transferring means; and j. a computer control mechanism for effecting operation of said several drive means to orient said truncated chordal surface in the uppermost rotated position when the punch press is in a punching mode and to rotate the magazine to locate the tool carrying element with the desired tooling in the uppermost position and then effect reciprocal movement of said transfer drive means.

17. The combination in accordance with claim 16 wherein said tool carrying elements of said magazine each have a pair of radially spaced tool carrying seats for a cooperating punch and die set, said tool carrying seats being horizontally aligned with said tool mounting and die receptacles when rotated into the uppermost position.

18. The combination in accordance with claim 16 wherein said mounting means comprises a shaft extending horizontally from said frame, and wherein said transfer mechanism effects horizontal movement of said magazine along said shaft in a reciprocal direction.

19. The combination in accordance with claim 16 wherein said tool carrying elements are equiangularly spaced about the inner face of said remainder of said periphery of said magazine and adjacent its periphery.

20. In a combination with a punch press or like appratus having a frame providing a horizontal support surface for an associated workpiece, and a reciprocable ram assembly with a tool mounting receptacle spaced above said support surface, a tool storage and transfer mechanism comprising:

a. a magazine having its prinicpal dimensions extending in a vertical plane parallel to the axis of reciprocation of said ram assembly and rotatable about a horizontal axis perpendicular thereto, said magazine having a major portion with a periphery circumscribing an arc of a first radial distance from said horizontal axis and a minor portion having a periphery of a second radial distance from said horizontal axis reduced from that of said first radial distance, the peripheries of said major and minor portions being generally continuous and defining a closed geometric figure, at least five tool carrying elements at spaced points along the periphery of said major portion, said tool carrying elements being each adapted to seat releasably a tool adapted to seat in the tool mounting receptacle, and tools seated in substantially all of said tool carrying elements, said magazine comprising the sole component of said punch press for storing tooling for movement into said tool mounting receptacle;

b. means mounting said magazine for rotating about said center point on a horizontal axis spaced a distance below the plane of said support surface, said distance being of a dimension to locate said tool carrying elements in horizontal alignment with said tool mounting receptacle when said magazine is rotated to locate them in uppermost position, said magazine limited peripheral portion being of reduced radial distance from said center point so as not to extend above the plane of said horizontal support surface when rotated into the uppermost position;

c. means for rotating said magazine to orient a selected tool mounting receptacle in said uppermost position for tooling transfer by said transferring means and for thereafter rotating said magazine to orient said reduced peripheral portion in said uppermost position so that said plane of said work support surface is spaced above said magazine to permit free motion of a workpiece thereover; and d. means for transferring tooling between the uppermost tool carrying element of said magazine and the tool mounting receptacle of said punch press, said transferring means effecting horizontal movement of said magazine along its axis of rotation to and from of said punch press to move the tooling supported thereon into the tool mounting receptacle of the ram assembly.

21. The combination in accordance with claim 20 wherein said punch press has a die receptacle vertically aligned below said tool mounting receptacle, and wherein said tool carrying elements of said magazine each have a pair of radially spaced tool carrying seats for a cooperating punch and die set, said tool carrying seats being horizontally aligned with said tool mounting and die receptacles when rotated into the uppermost position.

22. The combination in accordance with claim 20 wherein said magazine, mounting means and transfer means are disposed upon a common base which is removably engageable with said punch press frame.

23. The combination in accordance with claim 20 wherein said mounting means comprises a shaft extending horizontally from said frame, and wherein said transfer mechanism effects horizontal movement of said magazine about said shaft in a reciprocal direction.

24. The combination in accordance with claim 20 wherein said magazine is of truncated, generally circular peripheral configuration with a portion of its periphery removed to provide a chordal surface at a radial distance not greater than the radial spacing to the plane of the work support table.

25. The combination in accordance with claim 20 wherein said tool carrying elements are equiangularly spaced about the inner face of all but said limited portion of said magazine and adjacent its periphery.

26. The combination in accordane with claim 21 wherein said magazine is comprised of a pair of concentric magazine elements supported on said mounting means for concurrent rotation, the outer of which provides the tool carrying seat for the punch tooling and the inner of which provides the tool carrying seat for the die.

27. The combination in accordance with claim 26 wherein said mounting means comprises a shaft, wherein both of said magazine elements are supported on said shaft, and wherein said transfer mechanism effects horizontal movement of said magazine elements carrying said seats.

28. The combination in accordance with claim 20 wherein therein is included a computer control mechanism for automatically effecting rotation of said magazine and operation of said transfer means.

* * * * *

UNITED STATES PATENT AND TRADEMARK OFFICE
CERTIFICATE OF CORRECTION

PATENT NO. : 4,719,691

DATED : January 19, 1988

INVENTOR(S) : Hans Klingel

It is certified that error appears in the above-identified patent and that said Letters Patent is hereby corrected as shown below: Title page:

[30] Foreign Application Priority Data should be
--November 3, 1984--

Signed and Sealed this

Twelfth Day of July, 1988

Attest:

DONALD J. QUIGG

Attesting Officer

Commissioner of Patents and Trademarks